United States Patent
Kakarala et al.

(10) Patent No.: US 7,263,242 B2
(45) Date of Patent: Aug. 28, 2007

(54) METHOD FOR DETECTING REPETITIVE SURFACES IN AN OPTICAL MOUSE

(75) Inventors: Ramakrishna Kakarala, Santa Clara, CA (US); Michael John Brosnan, Fremont, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 561 days.

(21) Appl. No.: 10/350,722

(22) Filed: Jan. 23, 2003

(65) Prior Publication Data

US 2004/0146217 A1 Jul. 29, 2004

(51) Int. Cl.
*G06K 9/64* (2006.01)
(52) U.S. Cl. ............... 382/278; 382/209; 382/219; 358/464; 345/640
(58) Field of Classification Search ............ 382/209, 382/218, 278, 219; 348/586; 358/464, 465; 345/640
See application file for complete search history.

(56) References Cited

U.S. PATENT DOCUMENTS

| | | | | |
|---|---|---|---|---|
| 5,935,195 A | * | 8/1999 | Quine | 701/222 |
| 6,066,459 A | * | 5/2000 | Garini et al. | 435/6 |
| 6,111,981 A | * | 8/2000 | Tsubusaki et al. | 382/172 |
| 6,539,106 B1 | * | 3/2003 | Gallarda et al. | 382/149 |
| 6,654,062 B1 | * | 11/2003 | Numata et al. | 348/362 |
| 6,734,913 B1 | * | 5/2004 | Motta | 348/362 |
| 6,750,974 B2 | * | 6/2004 | Svetkoff et al. | 356/602 |
| 6,760,401 B2 | * | 7/2004 | Schmitz et al. | 378/62 |
| 6,931,146 B2 | * | 8/2005 | Aoki et al. | 382/107 |

OTHER PUBLICATIONS

Dunn et al. "Extracting Halftones from Printed Documents Using Texture Analysis" Proceedings of the 1996 International Conference on Image Processing, pp. 225-228.
Kuo, et al. "Color Halftone Document Segmentation and Descreening," Proceedings of the 2001 International Conference on Image Processing, pp. 1065-1068.

* cited by examiner

Primary Examiner—Matthew C. Bella
Assistant Examiner—Yosef Kassa

(57) ABSTRACT

A repetitive surface detector includes an image capture device capturing an image. An autocorrelator receives the image and generates a signal indicative of a repetitive background of the image. A controller determines a maximum and minimum value in the auto-correlated signal. An adder determines the signed difference between the maximum and minimum value. A comparator compares the signed difference with a threshold and generates an output that indicates when the image includes a repetitive background.

5 Claims, 2 Drawing Sheets

METHOD FOR DETECTING REPETITIVE SURFACES IN AN OPTICAL MOUSE

BACKGROUND

Identification, e.g. optical document scanning, or navigation, e.g. optical detection by an optical mouse, is difficult on highly repetitive surfaces, e.g. a halftone print of an image, where dots of ink are spaced at regular intervals on the printing surface, because the images taken of the surface at displacements that are related to the repetition spacing are virtually identical. This ambiguity in displacements results in significant errors in tracking motion. More precisely, when the repetition rate is high enough to produce one or more periods within the window of displacements searched by a navigation device, occasional false displacements are expected, leading to large tracking errors.

Methods for detecting halftones have been proposed in optical document scanning. One method uses a two-step process involving a Fourier transform of the entire document followed by filtering with a Gabor filter tuned from the results of the Fourier transform as disclosed by Dunn, et al. in "Extracting halftones from printed documents using texture analysis," *Proceedings of the* 1996 *International Conference on Image Processing*, pp. 225–228. Another method, developed for document analysis, also uses two-step processing, starting with a wavelet transform in the first step and detecting halftones with a Fourier transform applied to the wavelet sub-bands as disclosed by Kuo, et al. in "Color halftone document segmentation and screening," *Proceedings of the* 2001 *International Conference on Image Processing*, pp. 1065–1068.

Both methods require a substantial amount of memory, large enough to store a digital scan of an entire document and significant processing power to compute a Fourier transform. These requirements may be appropriate to a desktop personal computer but cannot be met in an inexpensive optical navigation component with limited memory and processing capability.

Because half-toned images are used on many mouse pads and artificial replica wood surfaces, it is important for optical detectors to detect their presence and make navigation decision accordingly to avoid tracking errors.

SUMMARY

The present invention is a simple method for detecting repetitive surfaces in images including the low spatial and intensity resolution image sensors used in inexpensive optical navigation devices.

In a preferred embodiment, a repetitive surface detector includes an image capture device capturing an image. An autocorrelator receives the image and generates a signal indicative of a repetitive background of the image. A controller determines a maximum and minimum value in the auto-correlated signal. An adder determines the signed difference between the maximum and minimum value. A comparator compares the signed difference with a threshold and generates an output that indicates when the image includes a repetitive background.

DETAILED DESCRIPTION

An optical mouse is a computer input device that determines motion from a sequence of images taken by an embedded image sensor while the mouse is moving on a surface. By comparing images taken at different times or "cross-correlating", the embedded microprocessor within the mouse can estimate the amount of motion that occurred within the elapsed time interval. The process of determining motion from the sequence of images is referred to as "optical navigation".

Many highly-repetitive surfaces, e.g. halftones, have a structure that can be modeled mathematically by amplitude modulation of a lowpass signal with a sinusoidal carrier. A simple approximation is $$h(x) \sim s(x)*(1+A*\cos(2\pi f(x))) \quad \text{Equation 1}$$

In this equation, h(x) is the surface, s(x) is the lowpass signal, A is the modulation index with |A|<1, and f is the repetition rate.

Optical navigation devices usually employ a filter to remove the lowpass components of a signal. Lowpass components do not vary significantly with shift, and are therefore not useful in measuring image displacement. After lowpass removal, the signal in the simple model of Equation 1 may be written as $$h(x) \sim s(x)*(A*\cos(2\pi f(x))) \quad \text{Equation 2}$$

The autocorrelation of h(x) in Equation 2 is repetitive with rate f. Since the lowpass components, particularly DC, have been removed, the autocorrelation of h(x) will have negative and positive values. The value at zero lag will be positive and it will be the maximum of the autocorrelation. If the repetition rate f is near the Nyquist rate of the sampling process, then the autocorrelation will become negative in the first or second lag, and rise to positive values in the second or third lag. This case is particularly crucial as a repetition rate near Nyquist indicates at least one period within three pixels, typically the minimum interval of displacements searched by navigation devices. In two dimensions, a repetition rate near Nyquist will ensure a pattern of positive and negative values within lag value of plus or minus two of the origin.

An index of highly repetitive surfaces can be formed by checking whether the autocorrelation values within the first +/− N lags take both positive and negative values. The range of lags searched depends upon the repetition rate to be detected, which in turn depends upon the range of displacements evaluated by the navigation device. In the preferred embodiments, a minimum of N=2 lags is searched.

In an alternate embodiment, cross-correlation between two image frames may be used for surface detection. The cross-correlation of two shifted versions of a signal peaks at the displacement and is nearly equal to the auto-correlation around the displacement location. Hence in the region around the peak of the cross-correlation, the method for repetitive surface detection may be applied.

Figure 1:
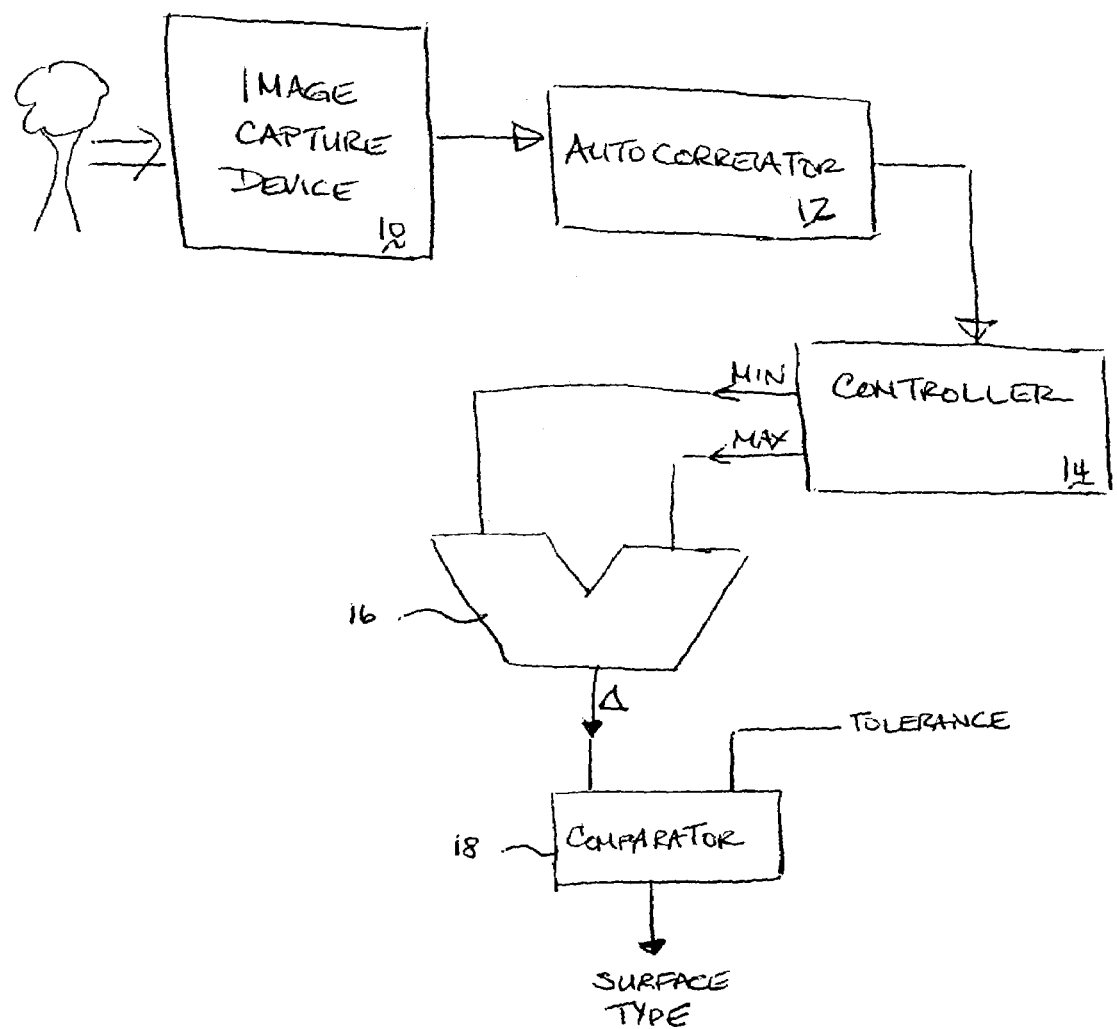
FIG. 1 illustrates a system according to the present invention.

FIG. 1 illustrates a system according to the present invention. An image capture device 10 receives an image. An auto-correlator 12 correlates the image and generates a signal indicative of the repetitive nature of the image. A controller 14 receives the signal and extracts a minimum value and a maximum value (in the search for the maximum we exclude the value at zero lag, which is always the global maximum value of the autocorrelation). An adder 16 receives the minimum and the maximum values to determine the signed difference. A comparator 18 compares the signed difference with a tolerance. If the signed difference is less than the tolerance, the surface has a repetitive nature. If the signed difference exceeds the tolerance, the surface does not have a repetitive nature.

The image capture device may be an optical navigation device, a digital camera (video or still), an optical scanner. The auto-correlator, controller, adder, and comparator may be implemented in hardware or software as will be obvious to onees skilled in the art.

Figure 2:
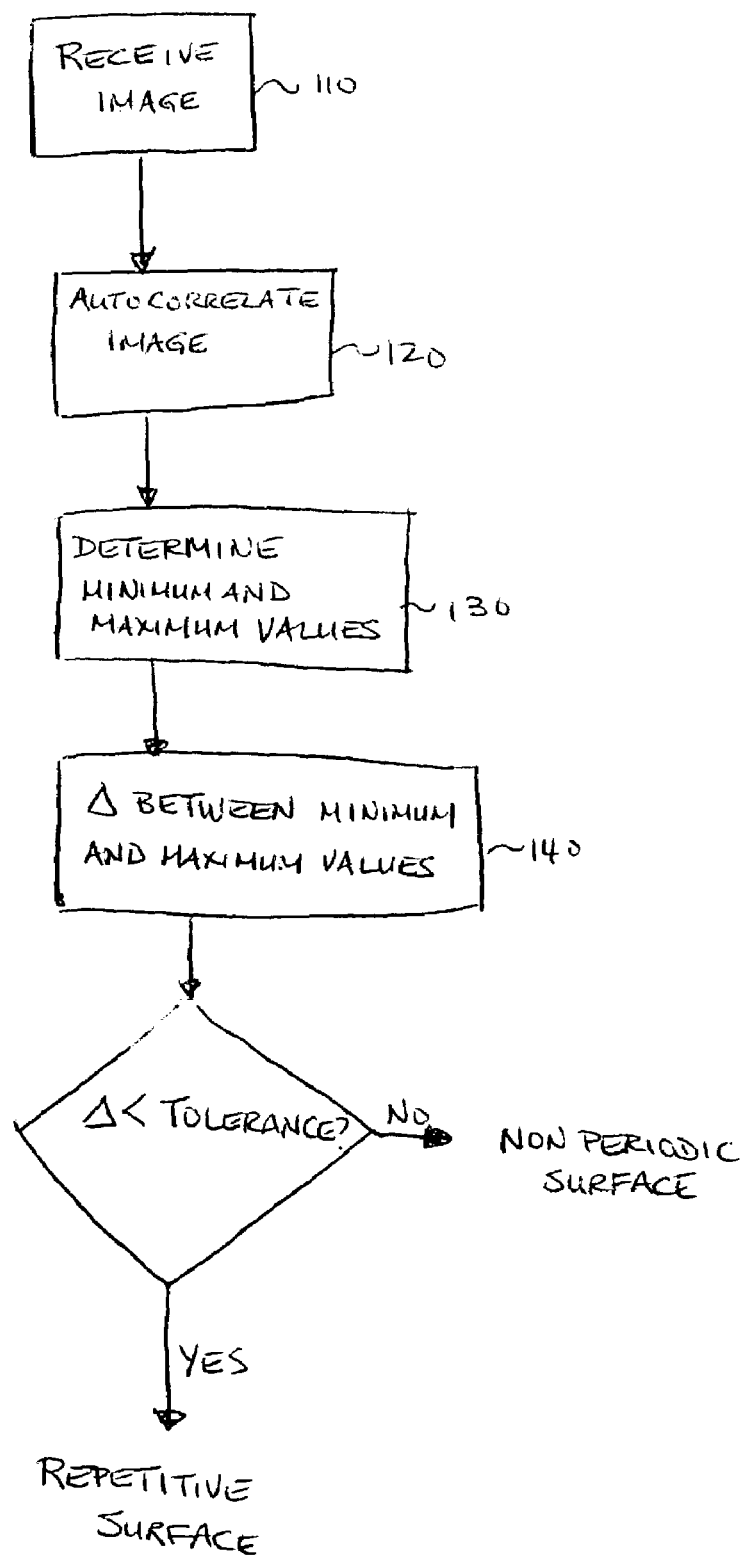
FIG. 2 illustrates a process according to the present invention.

FIG. 2 illustrates a process flowchart according to the present invention. In step 110, an image is received. In step 120, the image is auto-correlated. In step 130, a minimum and a maximum value is determined. In step 140, the difference between the minimum and the maximum values is determined. In step 150, the difference is compared with a tolerance. When the difference is within the tolerance range, the image includes a repetitive surface. When the difference exceeds the tolerance range, the image does not include a repetitive surface.

It will be obvious to ones skilled in the art to extend the invention to optical navigation devices that often use the cross-correlation of images to determine the shift between two images and therefore have dedicated correlation hardware. This same hardware can be used to compute the auto-correlation of input image with itself. Hence, values of the auto-correlation are readily attainable using the processing capabilities built within.

The invention claimed is:

1. A repetitive surface detector comprising:
   an image capture device capturing an image;
   an autocorrelator receiving the image and generating an auto-correlated signal indicative of a repetitive background of the image;
   a controller, receiving the auto-correlated signal, generating a minimum value and a maximum value;
   an adder, receiving the minimum and the maximum values, generating a difference;
   a comparator, receiving the difference and a reference value, generating an output indicating when the image includes a repetitive background.

2. A repetitive surface detector, as in claim 1, wherein the image capture device is a digital camera.

3. A repetitive surface detector, as in claim 1, wherein the image capture device is an optical scanner.

4. An optical navigation device comprising:
   a housing;
   an image capture device, within the housing, generating an image signal; and
   a microprocessor, receiving the image signal and generating a signal indicative of a surface;
   wherein generating a signal indicative of a surface comprises:
   auto-correlating the image signal;
   obtaining a difference between a minimum value and a maximum value within the auto-correlated image signal; and
   comparing the difference to a threshold value.

5. A method for detecting a repetitive surface comprising:
   capturing an image;
   auto-correlating the image;
   obtaining a difference between a minimum value and a maximum value within the auto-correlated image; and
   comparing the difference to a threshold value, when the difference is less than than the threshold value, a periodic surface has been detected.

* * * * *

UNITED STATES PATENT AND TRADEMARK OFFICE
CERTIFICATE OF CORRECTION

PATENT NO. : 7,263,242 B2 Page 1 of 1
APPLICATION NO. : 10/350722
DATED : August 28, 2007
INVENTOR(S) : Ramakrishna Kakarala It is certified that error appears in the above-identified patent and that said Letters Patent is hereby corrected as shown below:

Col. 4 Line 31 In Claim 5, after "than" delete "than".

Signed and Sealed this

Sixteenth Day of December, 2008

JON W. DUDAS
*Director of the United States Patent and Trademark Office*